United States Patent
Leisner et al.

(10) Patent No.: US 6,889,824 B2
(45) Date of Patent: May 10, 2005

(54) REDIRECTING DEVICE FOR A CONVEYING MEANS LOCATED ON A CONVEYING SECTION

(75) Inventors: Ernst Leisner, Ludwigsburg (DE); Ralph Schneider, Waiblingen (DE); Claus Scholpp, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 10/363,836

(22) PCT Filed: Aug. 30, 2001

(86) PCT No.: PCT/DE01/03307

§ 371 (c)(1),
(2), (4) Date: Mar. 10, 2003

(87) PCT Pub. No.: WO02/22471

PCT Pub. Date: Mar. 21, 2002

(65) Prior Publication Data

US 2004/0011629 A1 Jan. 22, 2004

(30) Foreign Application Priority Data

Sep. 15, 2000 (DE) .......................................... 100 45 742

(51) Int. Cl.⁷ .............................................. B65G 21/08
(52) U.S. Cl. ................................ 198/860.5; 198/860.1; 198/845
(58) Field of Search ........................... 198/860.1, 860.2, 198/860.3, 860.5, 837, 838, 845

(56) References Cited

U.S. PATENT DOCUMENTS

| 4,008,800 A | * | 2/1977 | Forsyth ................... 198/860.5 |
| 4,157,753 A | | 6/1979 | Garnier |
| 4,821,866 A | * | 4/1989 | Melgaard ................. 198/860.1 |
| 4,993,542 A | | 2/1991 | Nomura |
| 5,314,059 A | * | 5/1994 | Clopton ................... 198/860.1 |
| 5,562,202 A | * | 10/1996 | Newcomb et al. ....... 198/861.1 |

FOREIGN PATENT DOCUMENTS

| DE | 27 45 875 | 4/1978 |
| DE | 85 29 524.8 | 4/1987 |
| DE | 92 18 600.9 | 12/1994 |
| DE | 296 05 881 U1 | 8/1996 |
| DE | 195 32 391 A1 | 3/1997 |
| DE | 197 01 552 A | 7/1998 |
| EP | 1 055 617 A1 | 11/2000 |

* cited by examiner

Primary Examiner—James R. Bidwell
(74) Attorney, Agent, or Firm—Michael J. Striker

(57) ABSTRACT

A turning device (10) for a conveyance device (4) on a transfer line includes a housing (15) closed by means of a cover (30). Recesses are formed in the housing (15), into which the guide bars (43) of a semicircular-shaped turning element (36) for the conveyance device (4) mesh with positive engagement. The design of the turning device (10) allows the conveyance device (4) to be replaced without requiring access through the side of the housing (15). Furthermore, the design of the turning device (10) is particularly compact.

7 Claims, 2 Drawing Sheets

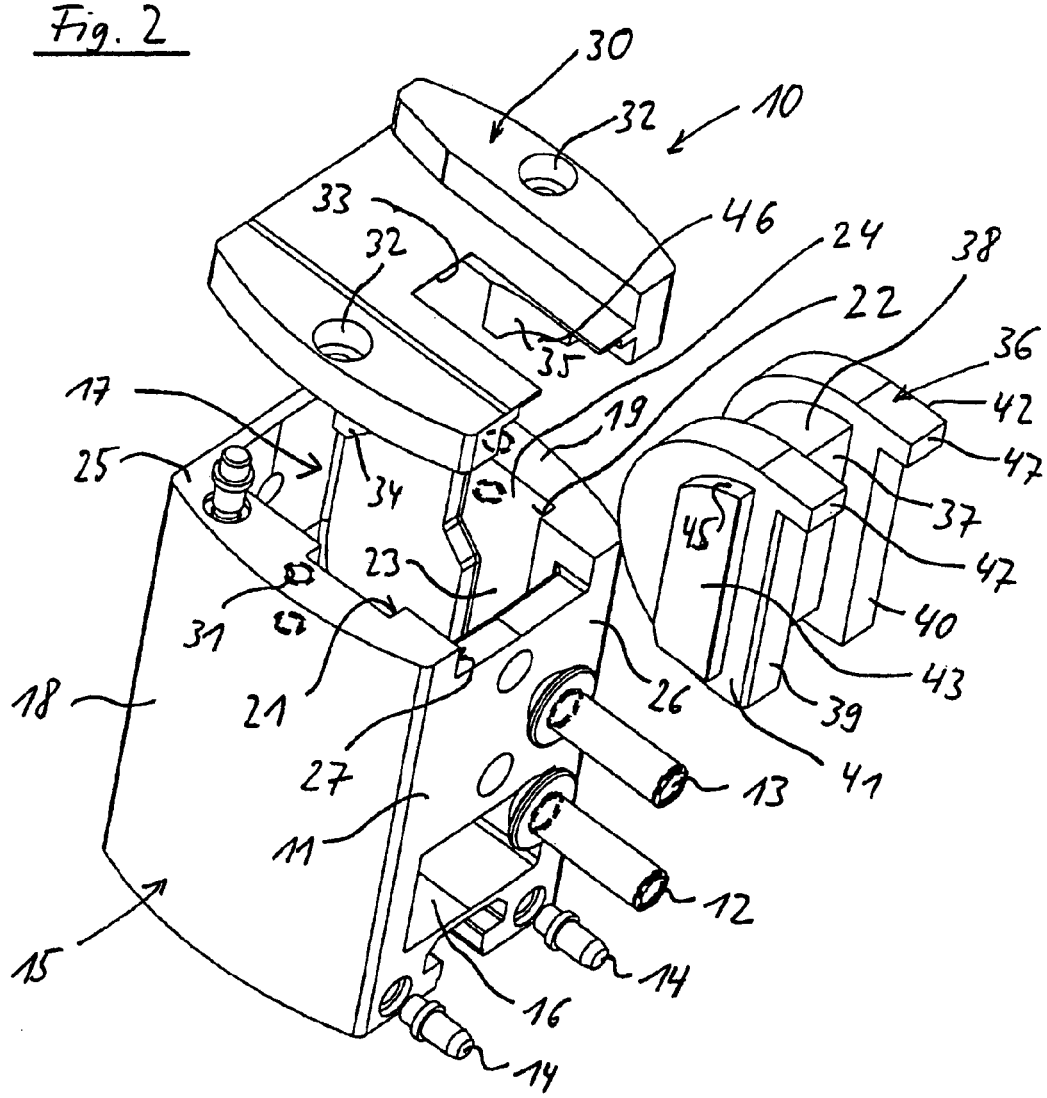

REDIRECTING DEVICE FOR A CONVEYING MEANS LOCATED ON A CONVEYING SECTION

BACKGROUND OF THE INVENTION

The invention concerns a turning device for a conveyance means on a transfer line. A known turning device of this type is a component of a transfer system that comprises, at the least, a drive head for the conveyance means, the transfer line formed out of profiled bars or the like, and the turning device. The turning device and the drive head are preferably located on the end surfaces and/or end faces of the profiled bars. The object of the turning device is to redirect the conveyance means overall from the incoming line to the outgoing line of the conveyance means by making one or multiple turns. With the known turning devices, the turning elements in the turning devices are realized as turn-around rollers, turn-around cylinders, toothed rollers or pinions. It is also essential that, in the case of the known turning devices, their housing is realized either as a basic, side-opening housing with a cover, or as a housing composed of two housing halves, so that, when a conveyance means designed, e.g., as a chain is installed or replaced, access to the housing through the side is required.

When complex assembly and/or transfer systems are built, the individual transfer lines are usually installed very close to each other to save space, so that the transport lines can only be accessed from the top. It therefore requires a great deal of assembly work to maintain or repair the conveyance means, which makes it necessary to dismantle and reassemble the conveyance means in the turning device and/or the housing.

SUMMARY OF THE INVENTION

In contrast, the turning device according to the invention for a conveyance means on a transfer line has the advantage that very little assembly work is required when repairing or maintaining the conveyance means, since costly dismantling and/or disassembly of the transport lines can be eliminated when transport lines are situated next to each other. This is attained by means of the invention by the fact that the turning element, including the conveyance means, is capable of being guided into the housing of the turning device from above. Access through the side of the turning device is therefore no longer required.

Additional advantageous further developments of the turning device according to the invention for a conveyance means on a transport line result from the dependent claims. In order to also reduce the assembly expense of the turning element, it is particularly advantageous to provide guides and/or recesses in the housing, into which the turning element is capable of being inserted with positive engagement. By using hold-down devices located on the cover, the turning element need not be mounted and/or immobilized in the housing. This function is performed simultaneously by the cover that immobilizes the turning element in the housing with positive engagement. The cover with integrated hold-down function can be realized particularly easily and cost-effectively when the cover is designed together with the hold-down devices as a one-piece component. In contrast to the turn-around rollers, turn-around cylinders, etc., known in the related art, the turning element itself can be produced particularly cost-effectively when it is composed of plastic. The conveyance means then turns around directly, i.e., in contact with the turning element. Forming the turning element out of plastic also makes it possible—in a particularly advantageous exemplary embodiment—to design the turning element substantially semicircular in shape. As a result, in contrast to the known turn-around rollers, turn-around cylinders, etc., installation space equivalent to approximately half of the diameter of a turn-around roller and/or turn-around cylinder is spared. As a result, the design of the turning device having a semicircular-shaped turning element is particularly compact.

BRIEF DESCRIPTION OF THE DRAWINGS

An exemplary embodiment of the invention is presented in the drawings and will be explained in greater detail hereinbelow.

FIG. 2 is an exploded view of a turning device, according to the invention, according to FIG. 1.

DETAILED DESCRIPTION OF THE PREFERRED EMBODIMENTS

Figure 1:
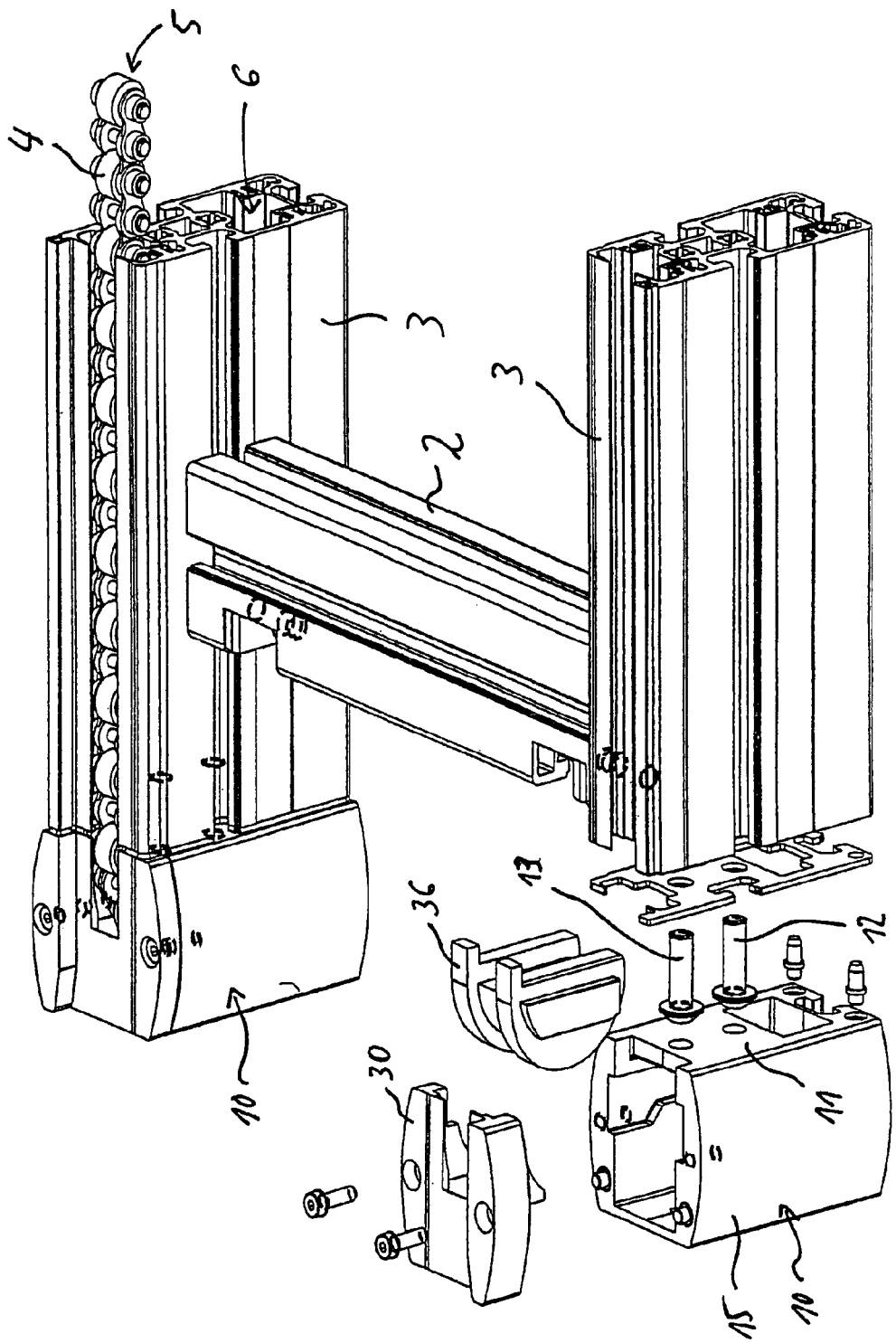
FIG. 1 is a perspective view of the end of a transfer system with installed and uninstalled turning device.

The turning device 10 shown in the figures is a component of a transfer system (not shown in greater detail), by means of which work piece carriers or the like can be conveyed between work stations, for example. The transfer system—only part of which is shown—comprises profiled line elements 3 situated parallel to each other and serving as transfer line, which said profiled line elements are interconnected by means of crossbars 2. A turning element 10 is capable of being mounted on each end face of a profiled line element 3, i.e., on a mounting surface 11, by means of screws 12, 13 with a stop plate as an intermediate layer. Positioning pins 14 under the screws 12, 13 serve to position the respective turning device 10 on the profiled line element 3. The turning device 10 serves to redirect an endless conveyance means, such as a chain carrier 4, from the transfer plane 5 into a return plane 6.

The turning device 10 comprises a metallic housing 15 that is produced preferably using the die-casting method. It can be formed as one piece, but it can also be composed of two interconnected housing half-shells, for example. The housing 15 has a recess 16 located below the mounting surface 11 and at the same level as the return plane 6, through which the chain carrier 4 is capable of being guided. The housing 15 has a cavity 17 inside. A recess 21, 22 serving as guide is formed on each of the two opposite side walls 18, 19 of the housing 15, which said recess has the shape of a rectangular groove in a lower region 23, and the width of which is expanded in its upper region 24. The recesses 21, 22 extend to the flat top side 25 of the housing 15. Furthermore, the front wall 26 of the housing 15 facing the profiled line element 3 comprises a recess 27 that extends from the top side 25 to just below the transfer plane 5.

The top side 25 and/or the cavity 17 of the housing 15 is capable of being closed by means of a cover 30 composed preferably of plastic, which said cover comprises blind holes 32 in threaded holes 31 of the housing 15 for securing it using screws. On the side facing the profiled line element 3 and/or the recess 27, the cover 30 comprises a recess 33 matched with the size of the chain carrier 4. On the underside of the cover 30, the cover has two hold-down devices 34, 35, which are integrally molded on the cover 30. The bar-shaped hold-down devices 34, 35 align with the recesses 21, 22 in the side walls 18, 19 of the housing 15.

A turning element 36 is capable of being placed in the cavity 17 of the housing. The turning element 36—which is produced as one piece out of a wear-resistant plastic—comprises a semicircular and/or semicylindrically-shaped main frame 37 with a contact surface 38 along which the chain carrier 4 glides in the operating state. Guide plates 39, 40 for the chain carrier 4 are also located on the side of the main body 37 that are also designed substantially semicircular in shape and extend past the main body 37. The width of the main body 37, including the two guide plates 39, 40, is sized so that it matches the width between the side walls 18, 19 in the housing 15. Moreover, guide bars 43 are integrally molded on the outwardly-facing outer surfaces 41, 42 of the guide plates 39, 40, the shape of which is designed to match the shape of the recesses 21, 22 in the side walls 18, 19 of the housing 15. In the exemplary embodiment shown, the guide bars 43 have a nearly rectangular outer shape to match the lower region 23 of the recesses 21, 22, and they have an arched hold-down surface 45 facing the top side 25 of the housing 15. The shape of the hold-down surfaces 45 is matched to the shape of the undersides 46 of the two hold-down devices 34, 35 of the cover 30. Finally, the two guide plates 39, 30 comprise guide noses 47 on the side facing the front wall 26 of the housing 15 that are matched with the recess 27 in the front wall 26 of the housing 15.

In order to replace a chain carrier 4 for purposes of performing maintenance or repair of the transfer system 1, it is not necessary to remove the housing 15 from the profiled line element 3. It is sufficient to remove the cover 30 and then remove the turning element 36—which is supported with positive engagement by means of the guide bars 43 in the recesses 21, 22 in the housing 15—from the housing 15. A chain carrier 4 can be reinserted by guiding one end of the chain carrier 4 around the contact surface 38 of the turning element 36 and inside the housing 15 until it reaches the recess 16. The turning element 36 is then pressed—with its guide bars 43—downward into the recesses 21, 22 of the housing 15 until the guide noses 47 of the guide plates 39, 40 bear against the bottom of the recess 27 in the front wall 26 of the housing 15. The vertical position of the turning element 36 is therefore adjusted in the housing 15.

The height of the turning element 36 in the housing 15 can also be adjusted, of course, by designing the shape and/or depth of the recesses 21, 22 accordingly. Finally, the cover 30 is screwed back in place on the top side 25 of the housing 15, whereby the two hold-down devices 34, 35 bear against the hold-down surfaces 45 of the two guide bars 43, thereby preventing the turning element 36 from moving upwardly when vertical stress is placed on the turning element 36 in the direction toward the top side 25.

What is claimed is:

1. A turning device (10) for a conveyance means (4) on a transfer line comprising a housing (15) capable of being mounted on a line element (3) of the transfer line, the top side (25) of which is closed by means of a cover (30), and comprising at least one turning element (36) for the conveyance means (4) located in the housing (15) that turns the conveyance means (4) out of a transfer plane (5) and into a return plane (6), wherein the housing (15)—starting on its top side (25) closed by means of the cover (30)—comprises a recess (17) into which the at least one turning element (36), including the conveyance means (4), is capable of being guided, wherein the housing (15) comprises at least one guide (21, 22), into which the turning element (36) is capable of being inserted with at least partial positive engagement, and wherein at least one hold-down device (34, 35) that immobilizes the turning element (36) in the housing (15) is located on the cover (30).

2. The turning device according to claim 1, wherein the cover (30), including the at least one hold-down device (34, 35), is designed as a one-piece component.

3. The turning device according to claim 1, wherein the turning element (36) is composed of plastic and comprises at least one projection (43) that interacts with the at least one guide (21, 22).

4. The turning device according to claim 1, wherein the turning element (36) is designed substantially semicircular in shape.

5. The turning device according to claim 4, wherein the turning element (36) has a main structure (37) that is bordered on either side by a guide plate (39, 40) on which a projection (43) is mounted.

6. The turning device according to claim 3, wherein the turning element (36) is designed as a one-piece component.

7. A turning device (10) for a conveyance means (4) on a transfer line comprising a housing (15) capable of being mounted on a line element (3) of the transfer line, the top side (25) of which is closed by means of a cover (30), and comprising at least one turning element (36) for the conveyance means (4) located in the housing (15) that turns the conveyance means (4) out of a transfer plane (5) and into a return plane (6), wherein the housing (15)—starting on its top side (25) closed by means of the cover (30)—comprises a recess (17) into which the at least one turning element (36), including the conveyance means (4), is capable of being guided, wherein the housing (15) comprises at least one guide (21, 22), into which the turning element (38) is capable of being inserted with at least partial positive engagement, and wherein the turning element (36) is composed of plastic and comprises at least one projection (43) that interacts with the at least one guide (21, 22).

* * * * *